(12) United States Patent
Harrington et al.

(10) Patent No.: US 8,593,671 B2
(45) Date of Patent: Nov. 26, 2013

(54) SYSTEM AND METHOD FOR CONTROLLING USAGE OF PRINTER RESOURCES

(75) Inventors: Steven J. Harrington, Webster, NY (US); Gavan Leonard Tredoux, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 877 days.

(21) Appl. No.: 12/580,854

(22) Filed: Oct. 16, 2009

(65) Prior Publication Data

US 2011/0090528 A1    Apr. 21, 2011

(51) Int. Cl.
*G06F 3/12* (2006.01)
*G06K 15/00* (2006.01)

(52) U.S. Cl.
USPC ....... 358/1.15; 358/1.13; 358/1.14; 358/1.16; 358/1.18

(58) Field of Classification Search
None
See application file for complete search history.

(56) References Cited

U.S. PATENT DOCUMENTS

| | | |
|---|---|---|
| 6,925,538 B2 | 8/2005 | Niwa et al. |
| 6,954,278 B1 | 10/2005 | Cronch et al. |
| 6,965,938 B1 | 11/2005 | Beasley |
| 7,187,465 B2 | 3/2007 | Keane et al. |
| 7,228,343 B2 | 6/2007 | Sanders |
| 7,243,225 B2 | 7/2007 | Poeluev et al. |
| 7,283,264 B2 | 10/2007 | Parry |
| 7,284,246 B2 | 10/2007 | Kemp et al. |
| 7,308,645 B2 | 12/2007 | Humpleman et al. |
| 7,581,229 B2 | 8/2009 | Watkins et al. |
| 7,600,050 B2 | 10/2009 | Aritomi |
| 7,802,306 B1 | 9/2010 | Adams et al. |
| 2001/0041991 A1 | 11/2001 | Segal et al. |
| 2001/0055492 A1 | 12/2001 | Wood et al. |
| 2002/0152296 A1 | 10/2002 | Baker |
| 2003/0005100 A1 | 1/2003 | Barnard et al. |
| 2003/0014368 A1 | 1/2003 | Leurig |
| 2003/0061489 A1 | 3/2003 | Pelly et al. |
| 2003/0093525 A1 | 5/2003 | Yeung et al. |
| 2004/0025165 A1 | 2/2004 | Desoli et al. |
| 2004/0145601 A1 | 7/2004 | Brielmann et al. |

(Continued)

OTHER PUBLICATIONS

U.S. Appl. No. 11/801,029—Prosecution History Between Jan. 31, 2012 and Jun. 7, 2012 for U.S. Appl. No. 11/801,029, filed May 8, 2007, published Apr. 17, 2008, As US 2008-0091800 A1 ; Inventor: Sorrentino.

(Continued)

*Primary Examiner* — Fan Zhang
*Assistant Examiner* — Haris Sabah
(74) *Attorney, Agent, or Firm* — Michael J. Nickerson; Basch & Nickerson LLP

(57) ABSTRACT

A system and method control usage of resources associated with a printing device by transmitting a print-ready document from a client device, over a network, to a printing device; intercepting the transmitted print-ready document before the transmitted print-ready document is received by the printing device; electronically extracting, using a processor, page, document, or user information from the intercepted print-ready document; electronically, using a processor, comparing the extracted page, document or user information with resource policies associated with the printing device; modifying the page, document, or user information within the intercepted print-ready document when the extracted page, document, or user information is in conflict with resource policies associated with the printing device to ensure that printing of the print-ready document is in compliance with the resource policies associated with the printing device; and submitting the modified print-ready document to the printing device for printing.

17 Claims, 5 Drawing Sheets

(56) References Cited

U.S. PATENT DOCUMENTS

| | | | |
|---|---|---|---|
| 2004/0179103 A1 | 9/2004 | Endo et al. | |
| 2005/0078332 A1* | 4/2005 | Brown | 358/1.14 |
| 2005/0120082 A1 | 6/2005 | Hessalink et al. | |
| 2005/0185211 A1 | 8/2005 | Foehr et al. | |
| 2005/0270587 A1 | 12/2005 | Yamakawa et al. | |
| 2006/0031327 A1 | 2/2006 | Kredo | |
| 2006/0059340 A1 | 3/2006 | Eldenmalm et al. | |
| 2006/0059462 A1 | 3/2006 | Yamamoto | |
| 2006/0085852 A1 | 4/2006 | Sima | |
| 2006/0087682 A1 | 4/2006 | Lee | |
| 2006/0146356 A1 | 7/2006 | Yang | |
| 2006/0179413 A1 | 8/2006 | Eifler et al. | |
| 2007/0033408 A1 | 2/2007 | Morten | |
| 2007/0097423 A1* | 5/2007 | Kawano | 358/1.15 |
| 2007/0127050 A1* | 6/2007 | Iwata et al. | 358/1.13 |
| 2007/0159663 A1 | 7/2007 | Tsujimoto | |
| 2007/0165276 A1* | 7/2007 | Nakashima | 358/1.15 |
| 2007/0174429 A1 | 7/2007 | Mazzaferri et al. | |
| 2007/0236717 A1* | 10/2007 | Nishikawa | 358/1.13 |
| 2008/0091800 A1 | 4/2008 | Sorrentino et al. | |
| 2008/0180725 A1 | 7/2008 | Levin | |
| 2008/0199040 A1 | 8/2008 | Jonsson | |
| 2008/0276297 A1 | 11/2008 | Shay | |
| 2009/0225349 A1 | 9/2009 | Hirai | |
| 2009/0225366 A1* | 9/2009 | Emori | 358/1.15 |
| 2009/0327456 A1 | 12/2009 | Tredoux | |
| 2010/0110472 A1 | 5/2010 | Harrington | |
| 2010/0110473 A1 | 5/2010 | Harrington | |

OTHER PUBLICATIONS

U.S. Appl. No. 12/261,129—Prosecution History as of Jun. 7, 2012 for U.S. Appl. No. 12/261,129, filed Oct. 30, 2008, published May 6, 2010, As US-2010-0110473-A1; Inventor: Steven J. Harrington.

U.S. Appl. No. 12/145,591, filed Jun. 25, 2008 for "Method and Apparatus for Extending Functionality of Netwroked Devises".

U.S. Appl. No. 12/261,120, filed Oct. 30, 2008 for "System and Method for Managing a Print Job in a Printing System".

U.S. Appl. No. 12/261,129, filed Oct. 30, 2008 for "System and Method for Managing a Print Job in a Printing System".

U.S. Appl. No. 12/261,120—Prosecution History as of Mar. 27, 2012 for U.S. Appl. No. 12/261,120, filed Oct. 30, 2008, Published May 6, 2010, As US-2010-0110472-A1; Inventor: Steven J. Harrington.

Prosecution History Between Jun. 8, 2012 and Oct. 29, 2012 for U.S. Appl. No. 12/261,129, filed Oct. 30, 2008, Published May 6, 2010, As US-2010-0110473-A1; Inventor: Steven J. Harrington.

U.S. Appl. No. 12/261,120—Prosecution History Between Mar. 28, 2012 and Nov. 13, 2012 for U.S. Appl. No. 12/261,120, filed Oct. 30, 2008, Published May 6, 2010, As US-2010-0110472-A1; Inventor: Steven J. Harrington.

U.S. Appl. No. 12/261,129—Prosecution History Between Jun. 8, 2012 and Oct. 29, 2012 for U.S. Appl. No. 12/261,129, filed Oct. 30, 2008, Published May 6, 2010, As US-2010-0110473-A1; Inventor: Steven J. Harrington.

U.S. Appl. No. 12/261,120—Prosecution History Between Nov. 14, 2012 and Jan. 8, 2013 for U.S. Appl. No. 12/261,120, filed Oct. 30, 2008, Published May 6, 2010, As US-2010-0110472-A1; Inventor: Steven J. Harrington.

U.S. Appl. No. 12/145,591—Prosecution History Between Jan. 27, 2012 and Jan. 15, 2013 for U.S. Appl. No. 12/145,591, filed Jun. 25, 2008, published Dec. 31, 2009, As US 2009-0327456 A1; Inventor Gavan Tredoux.

U.S. Appl. No. 11/801,029—Prosecution History Between Jun. 8, 2012 and Jan. 15, 2013 for U.S. Appl. No. 11/807,029, filed May 8, 2007, published Apr. 17, 2008, As US 2008-0091800 A1; Inventor Daniel G. Sorrentino.

* cited by examiner

SYSTEM AND METHOD FOR CONTROLLING USAGE OF PRINTER RESOURCES

BACKGROUND

Conventionally, a multiplicity of networked computers may share resources provided as common to all the computers on that network. An example of a shared resource is printing facilities.

FIG. 1 shows a conventional networked computer system with remote printing having a network 102 with two computers (104 and 106) and a shared printer 108. It is noted that there may be more than one printer and additional computers connected to the network 102. Since there is more than one computer on the network, all the computers can share the single printer.

In the conventional networked installation of FIG. 1, controlling the usage of the printer is minimal. For example, in a conventional system, a password or some such security mechanism may be required for a given user to be allowed to use the printer. However, such conventional network systems do not provide an easy process to control printer usage by that user at a level beyond allowed to use or not allowed to use, particularly if the printer is not co-located with one of the computers.

By limiting the control level to use or no use, conventional networked systems cannot impose restrictions on some of the resources associated with a printer. For example, it may be desirable to operate a color printer only during certain hours. Another example may be to require printing of long jobs in duplex, so as to save paper costs. Also, it may be desirable to control access to certain expensive media that is loaded in a printing device. The conventional network systems do not control the user's access to certain resources at this level.

While some resource restrictions may be controlled or imposed when creating a print job, it is not always possible to globally enforce such restrictions.

Thus, it would be desirable to provide a resource control mechanism that is associated with a printer on a global basis so that resource restrictions can be controlled and enforced at the print site.

BRIEF DESCRIPTION OF THE DRAWING

The drawings are only for purposes of illustrating various embodiments and are not to be construed as limiting, wherein.

DETAILED DESCRIPTION

Figure 1:
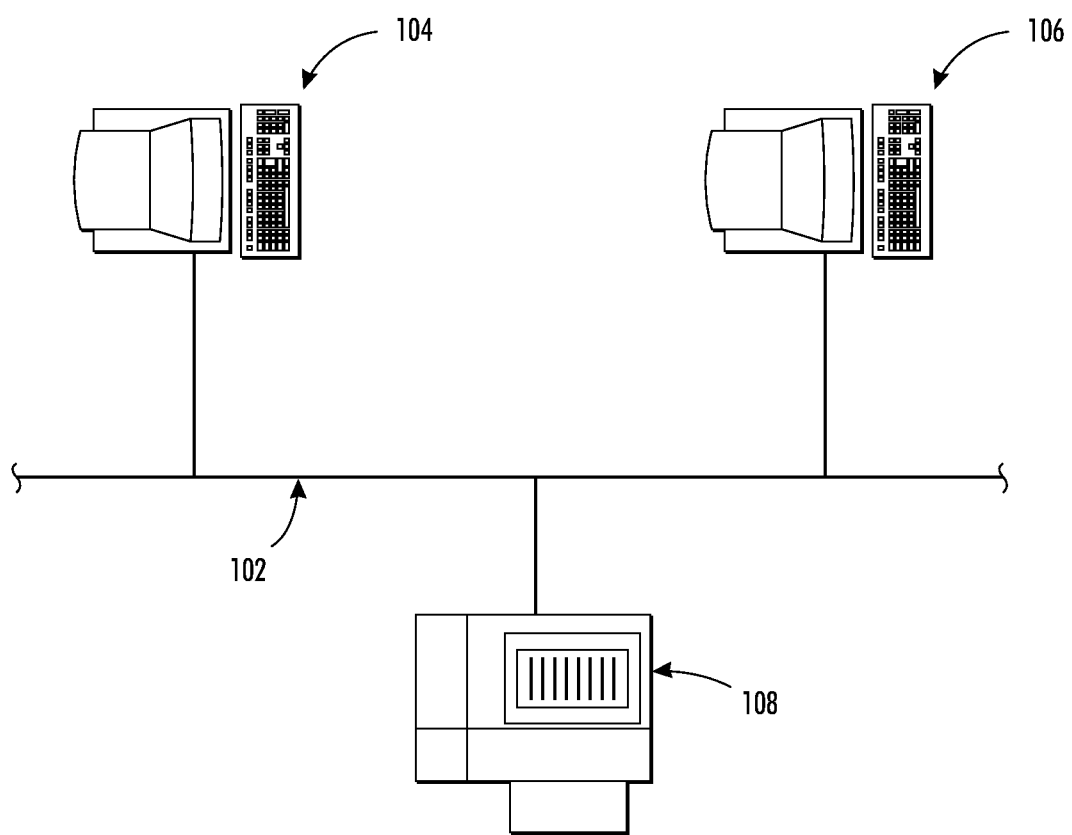
FIG. 1 illustrates a block diagram showing, in schematic form, a shared network printer.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Print ready documents are prepared at a user's computer. Such print ready documents are also known as print jobs. When a user, working on an application, prints a document, a program is invoked called a print driver that accepts a user application document and encodes the user application document into the page description language of the printer to generate a print-ready document. This print driver commonly is part of the underlying operating system of the user's computer. Alternatively, as will be understood by those skilled in the art, the print driver may be executed on a server that is remotely located from a user's computer.

An example of a page description language is Postscript™. Postscript™ contains instructions that define the various objects that may be included on a page, including text, graphics, and other image data. After encoding the user document in the page description language, the print-ready document is transmitted to the printer.

The print-ready document contains information that enables the associated printer to print the document in the format desired by the user. The print-ready document also contains control information that enables particular features of the printer. Such features may include, for example, duplex printing or printing in color, usage of specialized media, or other such options.

Since the print driver is unique to each printer model, the print driver is supplied by the manufacturer of the printer, and thus the exact expected format of print-ready documents can be known in advance. As noted above, it would be desirable to control access to certain resources associated with a shared network printer.

To facilitate the controlling of access to certain resources associated with a shared network printer, each print-ready document submitted to the printer is examined before being processed by the printer to find or obtain the control information therein. Depending on policies previously established, the control information within the print-ready document can be modified and/or additional control information can be added to the print-ready document to ensure that the printer usage conforms to any policy which was previously established for that printer.

As the embedded control information typically includes information that both controls printing of the overall document as well as information to control the particular specifics for each page in the document, by modifying the embedded control information, it becomes possible to modify not only the way the document, as a whole, is printed but also to modify the way individual pages of the document are printed.

As noted above, each print-ready document should be examined before being processed by the printer. To facilitate this examination, the print-ready document can be intercepted as it is being transmitted to the printer. An example of a document interception method and system is disclosed in co-pending U.S. patent application Ser. No. 12/145,591, entitled Method and Apparatus for Extending Functionality of Networked Devices, filed on Jun. 25, 2008. The entire content of co-pending U.S. patent application Ser. No. 12/145,591, filed on Jun. 25, 2008, is hereby incorporated by reference.

By intercepting a print-ready document prior to printing the document, implementation of global control of printer resources is enabled. By examining and modifying the embedded control information in the print-ready documents that are submitted to the printer, any desired resource or usage restrictions may be imposed regardless of the original printing request.

Figure 2:
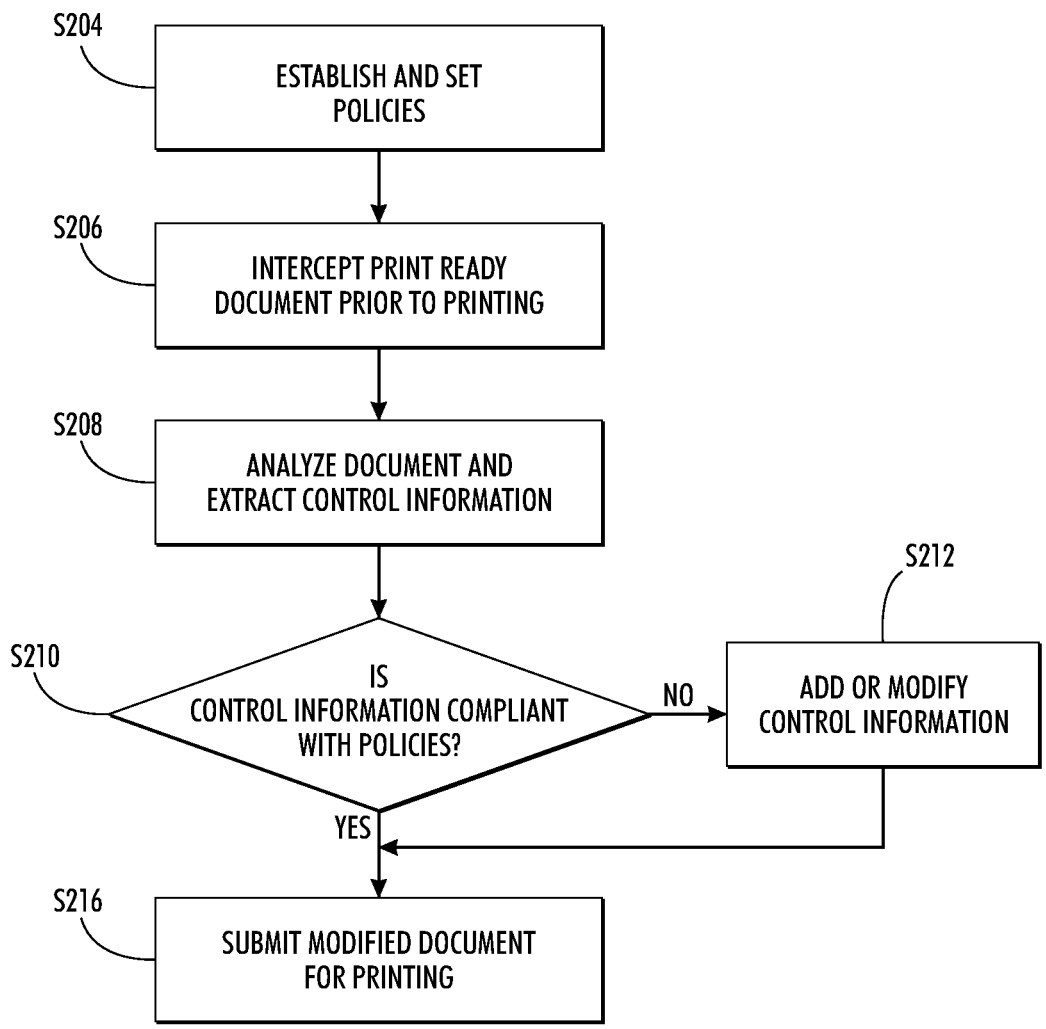
FIG. 2 illustrates a flowchart describing a method of controlling printer resources.

FIG. 2 shows a flowchart of an embodiment of such a method. At step S204, a set of policies are defined that will be used to govern usage of printer resources for a given printer. These policies are defined by the entities responsible for administering and maintaining the printer.

In step S206, a print-ready document is intercepted after submission for printing but before it is printed. In step S208, the print-ready document is analyzed to extract embedded control information. In step S210, the extracted document information is checked to see that the document complies with the previously established policies associated with the printer, which is to receive and print the print-ready document. If the document complies with the previously established policies associated with the printer, which is to receive and print the print-ready document, processing continues with step S216 where the document is submitted for printing.

However, if the document does not comply with the previously established policies associated with the printer, which is to receive and print the print-ready document, at step S212, the control information is either modified or new control information is inserted into the print-ready document and the modified print-ready document is submitted for printing. The modified or inserted new control information brings the document into compliance with the previously established policies associated with the printer, which is to receive and print the print-ready document.

In step S216, the document is submitted for printing. This submission may result in immediate printing, or, if the policy restricts the hours that printing can take place, the document is placed in a queue until a time that is consistent with the policy is reached.

An exemplary policy would be to check the number of pages in a document. If the number of pages exceeds a threshold level which is part of the set policy and if the document is not already set to print in duplex, additional control information can be inserted into the print-ready document to force the printing of the document in a duplex format.

Another exemplary policy might place limits on the usage of specialized resources. These specialized resources might include usage of color printing or usage of specialized media. Taking the usage of color printing as an example, the policy might place a limit on the number of color pages that can be printed. This restriction can be enforced by inserting control information in the document to alter the printing to monochrome printing after the requisite number of color pages has been printed.

Alternatively, a policy might establish usage of color printing only during certain times of the day. For example, the policy might disallow any color printing after some particular time. This policy can be enforced by examining the clock time and if the current time is not in compliance with the policy, inserting control information in the document to queue the document for printing until such time as the document's printing is consistent with the policy.

Another policy might establish time constraints on printing. For example, the policy might limit printing to a limited time period during the day. In such a case, the print ready document may be queued for printing at a later time consistent with the policies.

Any of the policies that are established may be applied uniformly to all documents. Alternatively, some policies may be applied on a user-by-user basis. By including user identification in the embedded control information, exceptions or alternatives to policies might be allowed for certain users that are defined in the policy.

Figure 3:
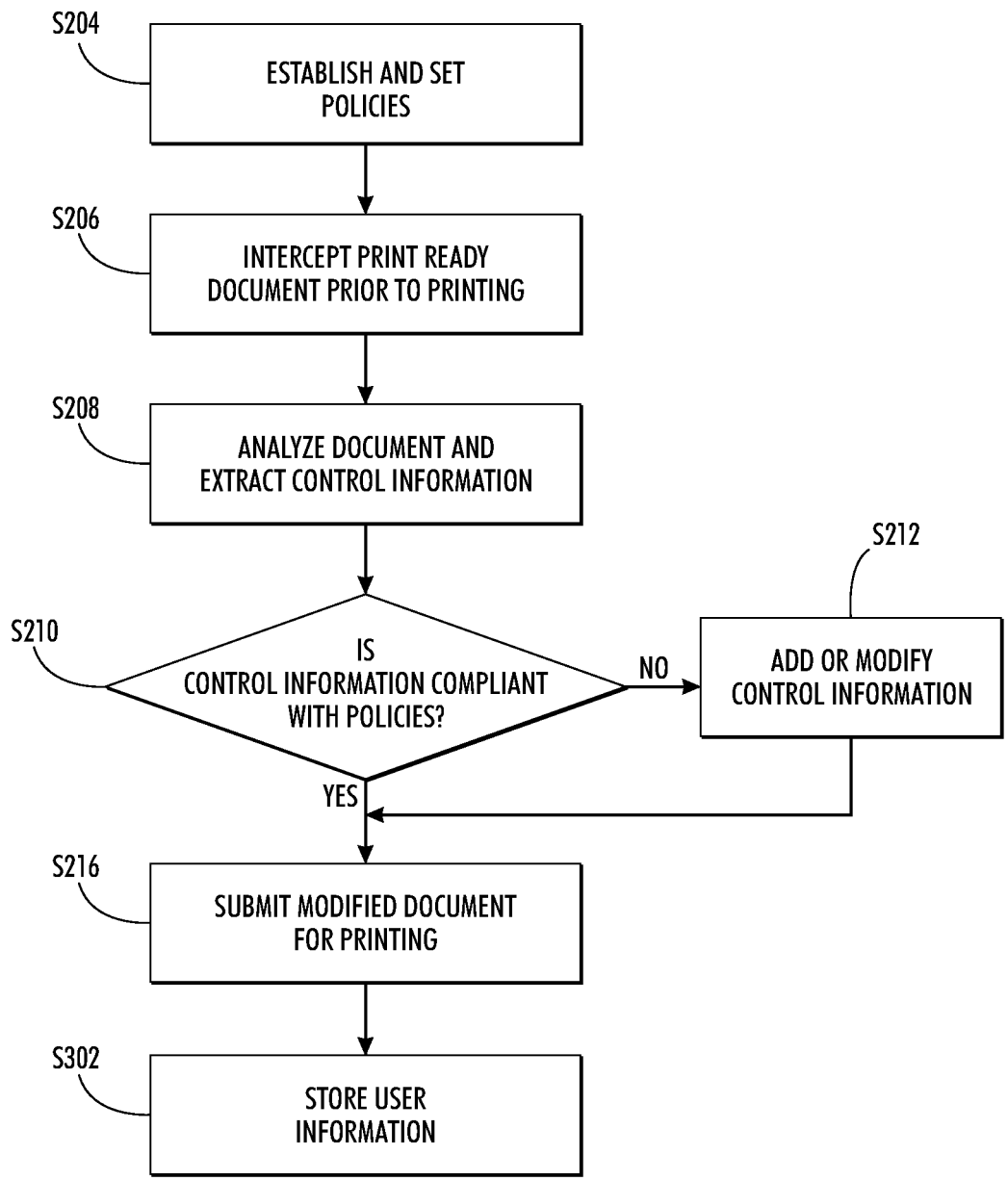
FIG. 3 illustrates a flowchart describing a method of controlling printer resources.

In FIG. 3, the process proceeds as previously described in FIG. 2, but after step S216, in step S302, the previously extracted user information is stored in a database that can track usage of the printer resources by each user. Such user information might include, for example, keeping track of usage of printer resources for each user. The extracted user information can be used to update a database containing user accounting data to track usage of controlled resources.

By including user information as part of the control information, the policies can be established on a user-by-user basis as well as on a global basis. Such user-by-user policies might include further limiting of resources like color printing based on a quota established for each user. Alternatively, a policy option might allow certain users to override the policy that limits usage of specialized resources.

In the Postscript™ examples, which follow, those skilled in the art will appreciate that the discussion and concepts are not limited to Postscript™ alone, but may indeed be implemented in other page description language code or software description.

Further, those skilled in the art will also appreciate that such methodologies as described herein may be invoked by separate hardware external to the printer or multi-function device, or may be performed by the suitably equipped printer or multi-function device when loaded with software reflecting the process and concepts provided herein, or by other combinations of software and hardware such as skilled artisans may apply in view of that which is taught herein.

As an example of an embodiment regarding how control information is embedded in a document, the following Postscript™ code sets the printing mode to be color. The Postscript™ code uses the Postscript™ setpagedevice command to enable color printing:

```
%%BeginFeature: ProcessColorModel RGBColor
(<<) cvx exec /ProcessColorModel /RGBColor (>>) cvx exec
setpagedevice
%%EndFeature
```

As a further example of how usage of color printing can be controlled, insertion of the following Postscript™ code in the document after the previous code sample would force the page to be printed in black and white even if some of the objects to be printed may be defined as colored:

```
%%BeginFeature: ProcessColorModel DeviceGray
(<<) cvx exec /ProcessColorModel /DeviceGray (>>) cvx exec
setpagedevice
%%EndFeature
```

Invocation of the code of the previous example would force the conversion of any color information to an appropriate shade of gray by the Postscript™ interpreter on the printer.

It should be noted that the control information in the code samples shown above, follows a particular format. The control information begins with the string "%%BeginFeature:" followed by a Postscript™ comment that describes the feature to be enabled. This is followed by one or more lines of Postscript™ code that enable the desired feature when the document is interpreted by the Postscript™ interpreter on the printer. The control information is concluded with the string "%%EndFeature". This particular formatting makes it possible to identify any control information that is embedded in the document. Techniques for identifying a particular string in a document are well known in the art and will not be further described here.

In addition, the control information can include instructions that control particular features as exemplified by the examples above, but it may also contain both control information that governs the printing of the document as a whole and control information that controls the printing of each page of the document. An example would be to group the control information that governs the whole document together and tag it with some identifiable Postscript™ code.

A set of Postscript™ code that serves to identify the group of control information that covers the entire document might look like:

```
%%BeginSetup
... setup code that applies to whole document here
%% EndSetup
```

A set of Postscript™ code that identifies control information that relates the current page might look like:

```
%%BeginPageSetup
... setup code specific to page here
%% EndPageSetup
```

In a similar manner, tags can be added to identify other information, for example user identification. By using a specific, predefined format for these tags the information can be easily identified to enable policy enforcement.

Since the format of the control information is done by the print driver when the user document is submitted for printing, the exact form of the tags that identify each type of control information is known in advance. Since the entities that provide the printer, also provide the print driver that embeds the desired control information in the document, control information to invoke the control mechanisms described herein may be implemented as part of the normal development process for the print driver.

The methods described above may be implemented in a variety of ways. One embodiment would encode the method in a set of computer instructions for the print controller as discussed above. In another embodiment, the process code be encoded on a computer-readable storage medium and loaded into a device having computer processing capabilities.

An alternative embodiment would implement the methods described using a separate system that intercepts any print jobs as the print jobs are sent to the printer. Such a system would be inserted in the connection between the network 102 of FIG. 1 and the printer 108 of FIG. 1.

Figure 4:
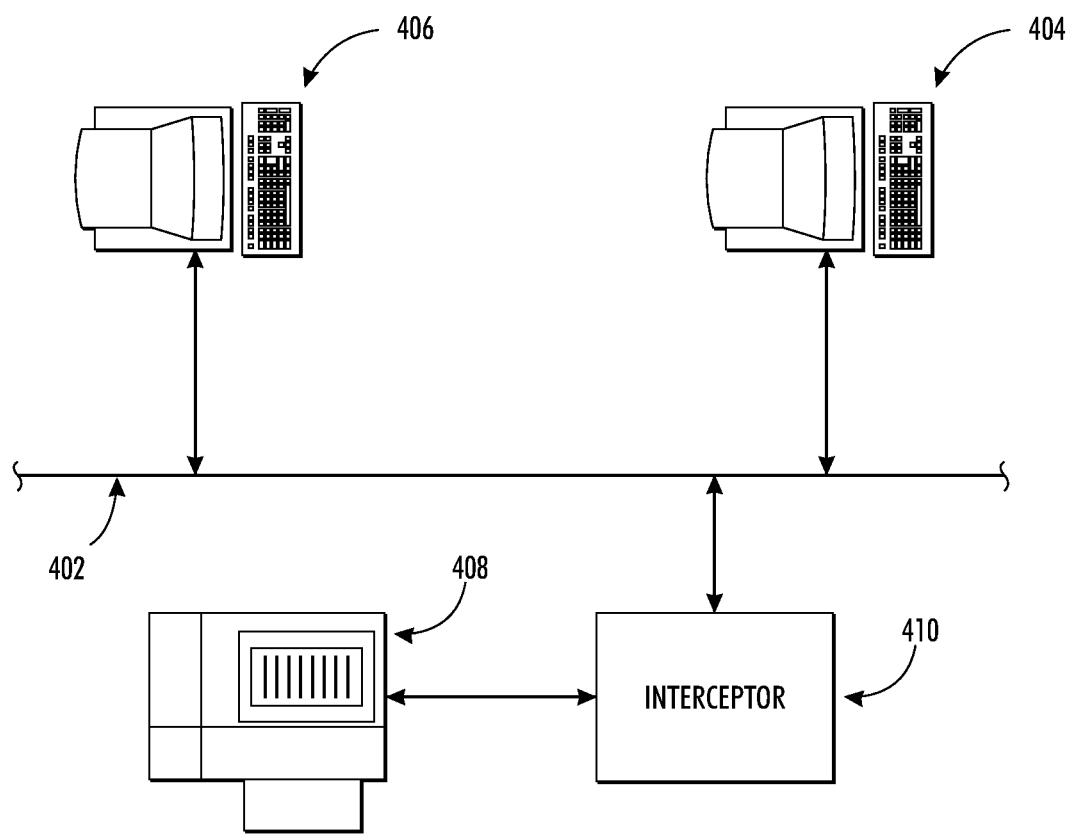
FIG. 4 illustrates a block diagram showing a system to control printer resources.

FIG. 4 shows such a network 402 with two computers (404 and 406) and a shared printer 408. There may of course be more than one printer and additional computers. FIG. 4 also shows interceptor 410. The interceptor 410 is inserted between the printer 408 and the network 402. The interceptor 410 captures any print job destined for printer 408 and processes the print job before the print job is forwarded to the printer 408. From the point of view of a user of a remote computer, the interceptor 410 appears as the printer 408.

The interceptor 410 examines the details of each print job and extracts user, page, and document information from the print job. By comparing the extracted user, page, and document information with the established policies of the printer 408, the interceptor 410 may alter the print job to impose restrictions on the print job to ensure that it is compliant with the policies previously established for the printer 408. The interceptor 410 may also be configured to forward the collected data to an external source, for example, to allow for an accounting of printer usage.

Because the remote computer may also submit information requests to the remote printer 408, for example, a request to see the status of the printer 408, the interceptor 410 will identify such information requests and forward the requests to the printer 408. The interceptor 410 is also designed so that any outgoing network traffic originating from the printer 408 is simply forwarded by the interceptor 410 to the network 402.

Figure 5:
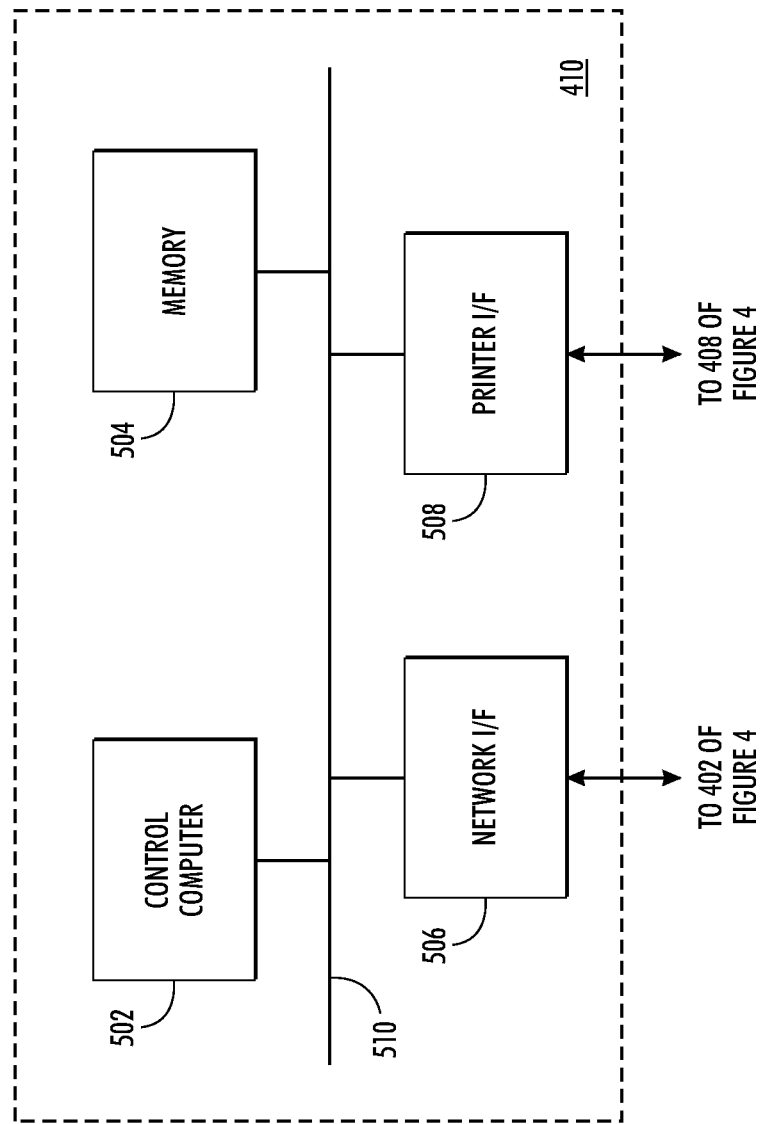
FIG. 5 illustrates in block diagram form an example embodiment of an interceptor system from FIG. 4.

FIG. 5 shows, in block diagram form, an example embodiment of the interceptor system 410 from FIG. 4. The interceptor system 410 includes a control computing element 502, which is usually a microprocessor, but may also be implemented, as will be apparent to one skilled in the art, as a custom ASIC or other hardware implementation. There is a memory 504 that contains the set of instructions for the control computer 502 that implement the process of comparing the extracted user, page, and document information with the established policies of the printer 408, as well as, making any modifications to the control information of the document. The memory 504 also might include any alterable memory that can be used during the processing of the intercepted document.

Two interfaces, network interface 506 and printer interface 508, are also part of the system. Network interface 506 accepts input documents from remote computers. Network interface 506 would connect to the network 402 of FIG. 4.

Printer interface 508 in turn connects to the printer 408 of FIG. 4. Printer interface 508 might also be a network interface that would interface with the network interface of the printer. Alternatively, Printer interface 508 may simply be a USB connection. Other interfaces may be added, depending on the requirements of the printer. There is a bus connection 510 that connects the control computing element 502, the memory 504, and the interfaces 506 and 508 together.

The set of instructions stored in memory 504 would include instructions to accept and store any policy rules that are to be imposed on the printer. For example, instructions may be provided that would accept and store policy information via the network interface 506 from a policy server. Policy rules might alternatively be retrieved as needed from a policy server via the network interface 506. The advantage of a policy server is that it provides a single instance of the policy specification that could be used to control a number of interceptors.

The set of instructions stored in memory 504 could also include instructions that may enable the central processor to process extracted user information. This process could include collecting and storing information about each user. The process may further include transmitting any collected user information to a remote computer via the network interface 506.

While the embodiments described above have addressed the issue of controlling the usage of resources of a physical printer, the methods described can also be used to embed a desired set of control onto a virtual printer.

An example of a virtual printer is a software program that accepts a document from a user and generates a portable document format version of the document. The portable document format version of document can be subsequently distributed to other users. By embedding control information in the portable document format version of document, any future printing of the document can be controlled.

In summary, a method for controlling usage of resources associated with a printing device by transmitting a print-ready document from a client device, over a network, to a printing device; intercepting the transmitted print-ready document before the transmitted print-ready document is received by the printing device; electronically extracting, using a processor, page, document or user information from the intercepted print-ready document; electronically, using a processor, comparing the extracted page, document or user information with resource policies associated with the printing device; modifying the page, document or user information within the intercepted print-ready document when the extracted page, document or user information is in conflict with resource policies associated with the printing device to ensure that printing of the print-ready document is in compliance with the resource policies associated with the printing device; and submitting the modified print-ready document to the printing device for printing.

The method may modify the print-ready document to limit the printing of the print-ready document to certain times according to the resource policies associated with the printing device; to limit the usage of color printing resources according to the resource policies associated with the printing device; to print as duplex when needed for compliance with the resource policies associated with the printing device; and/or to limit the usage of specialized media resources according to the resource policies associated with the printing device.

The method may update user information associated with printer resource usage in response to the extracted user, page, and document information. Also, the printer may be a portable document format converter. The resource policies associated with the printing device may be user dependent. In addition, the page, document, or user information within the intercepted print-ready document may be modified on a page-by-page basis.

A system to enable the controlling of the usage of resources associated with a printing device may include a plurality of client devices for generating print-ready documents; a printing device; a network to communicatively connect the plurality of client devices with the printing device; and an intercepting device, operatively connected between the network and the printing device, to intercept the print-ready document transmitted from a client device to the printing device.

The intercepting device extracts page, document or user information from the intercepted print-ready document; compares the extracted page, document or user information with resource policies associated with said printing device; modifies the page, document or user information within the intercepted print-ready document when the extracted page, document or user information is in conflict with resource policies associated with the printing device to ensure that printing of the print-ready document is in compliance with the resource policies associated with the printing device; and submits the modified print-ready document to the printing device for printing.

The intercepting device may modify the print-ready document to limit the printing of the print-ready document to certain times according to the resource policies associated with the printing device; may modify the print-ready document to limit the usage of color printing resources according to the resource policies associated with the printing device; may modify the print-ready document to print as duplex when needed for compliance with the resource policies associated with the printing device; and/or may modify the print-ready document to limit the usage of specialized media resources according to the resource policies associated with the printing device.

A device to control usage of resources associated with a printing device includes an input port to intercept the print-ready document transmitted from a client device to a printing device; an output port to provide a connection to the printing device associated with the intercepted print-ready document; and a processor, operatively connected to said input port and said output port.

The processor extracts page, document or user information from the intercepted print-ready document; compares the extracted page, document or user information with resource policies associated with said printing device; modifies the page, document, or user information within the intercepted print-ready document when the extracted page, document or user information is in conflict with resource policies associated with the printing device to ensure that printing of the print-ready document is in compliance with the resource policies associated with the printing device; and submits the modified print-ready document to the printing device for printing.

The processor may modify the print-ready document to limit the printing of the print-ready document to certain times according to the resource policies associated with the printing device; may modify the print-ready document to limit the usage of color printing resources according to the resource policies associated with the printing device; may modify the print-ready document to print as duplex when needed for compliance with the resource policies associated with the printing device; and/or may modify the print-ready document to limit the usage of specialized media resources according to the resource policies associated with the printing device.

The processor may submit the intercepted print-ready document to the printing device when the extracted page, document, or user information is in agreement with resource policies associated with the printing device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for controlling usage of resources associated with a printing device, comprising:

transmitting a print-ready document from a client device, over a network, to the printing device;

intercepting the transmitted print-ready document before the transmitted print-ready document is received by the printing device;

electronically extracting, using a processor, page, document, or user information from the intercepted print-ready document;

electronically, using a processor, comparing the extracted page, document, or user information with resource policies associated with the printing device;

modifying the page, document or user information within the intercepted print-ready document when the extracted page, document, or user information is in conflict with resource policies associated with the printing device to ensure that printing of the print-ready document is in compliance with the resource policies associated with the printing device, the modifying of the print-ready document limiting the usage of color printing resources according to the resource policies associated with the printing device; and submitting the modified print-ready document to the printing device for printing.

2. The method of claim 1 wherein the modifying of the print-ready document limits the printing of the print-ready document to certain times according to the resource policies associated with the printing device.

3. The method of claim 1 wherein the modifying of the print-ready document modifies the print-ready document to print as duplex when needed for compliance with the resource policies associated with the printing device.

4. The method of claim 1 wherein the modifying of the print-ready document limits the usage of specialized media resources according to the resource policies associated with the printing device.

5. The method of claim 1 further comprising:

updating user information associated with printer resource usage in response to the extracted user, page, and document information.

6. The method of claim 1 wherein the printer is a portable document format converter.

7. The method of claim 1 wherein the resource policies associated with the printing device are user dependent.

8. The method of claim 1 wherein the page, document, or user information within the intercepted print-ready document is modified on a page-by-page basis.

9. A system to enable controlling of usage of resources associated with a printing process, comprising:

a plurality of client devices for generating print-ready documents;

a printing device;

a network to communicatively connect said plurality of client devices with said printing device; and an intercepting device, operatively connected between said network and said printing device, to intercept the print-ready document transmitted from a client device to said printing device;

said intercepting device extracting page, document, or user information from the intercepted print-ready document;

said intercepting device comparing the extracted page, document or user information with resource policies associated with said printing device;

said intercepting device modifying the page, document, or user information within the intercepted print-ready document when the extracted page, document or user information is in conflict with resource policies associated with said printing device to ensure that printing of the print-ready document is in compliance with the resource policies associated with said printing device;

said intercepting device modifying the print-ready document to limit the usage of color printing resources according to the resource policies associated with said printing device;

said intercepting device submitting the modified print-ready document to said printing device for printing.

10. The system of claim 9 wherein said intercepting device modifies the print-ready document to limit the printing of the print-ready document to certain times according to the resource policies associated with said printing device.

11. The system of claim 9 wherein said intercepting device modifies the print-ready document to print as duplex when needed for compliance with the resource policies associated with said printing device.

12. The system of claim 9 wherein said intercepting device modifies the print-ready document to limit the usage of specialized media resources according to the resource policies associated with said printing device.

13. A device to control usage of resources associated with a printing device, comprising:

an input port to intercept the print-ready document transmitted from a client device to the printing device;

an output port to provide a connection to the printing device associated with the intercepted print-ready document; and a processor, operatively connected to said input port and said output port;

said processor extracting page, document, or user information from the intercepted print-ready document;

said processor comparing the extracted page, document, or user information with resource policies associated with said printing device;

said processor modifying the page, document, or user information within the intercepted print-ready document when the extracted page, document or user information is in conflict with resource policies associated with the printing device to ensure that printing of the print-ready document is in compliance with the resource policies associated with the printing device;

said processor modifying the print-ready document to limit the usage of color printing resources according to the resource policies associated with the printing device;

said processor, through said output port, submitting the modified intercepted print-ready document to the printing device.

14. The device of claim 13 wherein said processor modifies the print-ready document to limit the printing of the print-ready document to certain times according to the resource policies associated with the printing device.

15. The device of claim 13 wherein said processor modifies the print-ready document to print as duplex when needed for compliance with the resource policies associated with the printing device.

16. The device of claim 13 wherein said processor modifies the print-ready document to limit the usage of specialized media resources according to the resource policies associated with the printing device.

17. The device of claim 13 wherein said processor submits the intercepted print-ready document to the printing device when the extracted page, document or user information is in agreement with resource policies associated with the printing device.

* * * * *